United States Patent [19]
Banyas et al.

[11] 3,868,010
[45] Feb. 25, 1975

[54] HANDLING APPARATUS FOR A HOLLOW GLASS ARTICLE

[75] Inventors: John D. Banyas, Toledo; Edward A. Ross, Waterville, both of Ohio

[73] Assignee: Owens-Illinois, Inc., Toledo, Ohio

[22] Filed: Aug. 30, 1972

[21] Appl. No.: 284,700

Related U.S. Application Data

[62] Division of Ser. No. 77,425, Oct. 2, 1970, Pat. No. 3,726,559.

[52] U.S. Cl. ............................... 198/179, 198/240
[51] Int. Cl. ............................................. B65g 15/00
[58] Field of Search ............ 278/107; 198/203, 110, 198/178, 127, 179, 16

[56] References Cited
UNITED STATES PATENTS

| | | | |
|---|---|---|---|
| 387,727 | 8/1888 | Middleton | 198/208 |
| 1,682,014 | 8/1928 | Margles | 198/16 |
| 1,851,380 | 3/1932 | Briggs | 198/189 |
| 1,857,730 | 5/1932 | Lindgren | 198/203 |
| 2,558,832 | 7/1951 | Eriksson | 198/137 |
| 3,141,544 | 7/1964 | Hansen | 198/203 |
| 3,292,769 | 12/1966 | Zuppiger | 198/110 |
| 3,297,127 | 1/1967 | Dennerlien | 198/203 |
| 3,530,799 | 9/1970 | Braun | 198/189 |
| 3,567,010 | 3/1971 | Stien | 198/127 R |
| 3,612,254 | 10/1971 | Wideman | 198/179 |
| 3,672,484 | 6/1972 | Angiolettie | 198/110 |

*Primary Examiner*—Richard E. Aegerter
*Attorney, Agent, or Firm*—J. R. Nelson

[57] ABSTRACT

An apparatus for handling a hollow glass article and forming a finish thereon in a production line. Glass articles, such as containers, having an integrally formed moil portion on the upper end of the container body portion are loaded in sequence in an upright position into uniformly spaced chucks on the upper run of a continuously moving endless conveyor. The conveyor carries the container around a vertical end turn to enable the moil to drop freely upon severance by a burner assembly extending along the lower run of the conveyor. The conveyor is of the endless chain type with container chucks mounted upon transversely extending link pins of the chain, the chain being guided throughout its path by stationary track assemblies upon which chain carried rollers are supported. A main drive sprocket is drivingly engaged with both the upper and lower runs of the chain at a location between the end turns, while a second or slave drive sprocket engages the lower run of the chain only. Tension in that portion of the lower run of the chain between the points at which it is engaged by the main and slave sprockets is regulated by adjusting the speed of the slave drive sprocket motor relative to the main sprocket drive motor, this particular section of chain traversing the burner assembly through which a relatively high degree of chain tension is desired. Longitudinally adjustable end turn track sections, combined with the three point engagement between the sprockets and chain enable the tension in various sections of the chain to be regulated or adjusted independently of one another. Parabolic merging sections of the chain track are provided between the horizontal upper and lower runs and the curved end turn sections to minimize centripetal acceleration imparted to chucks carried by the chain as the chucks pass from the straight upper and lower runs to the curved end turn sections.

7 Claims, 20 Drawing Figures

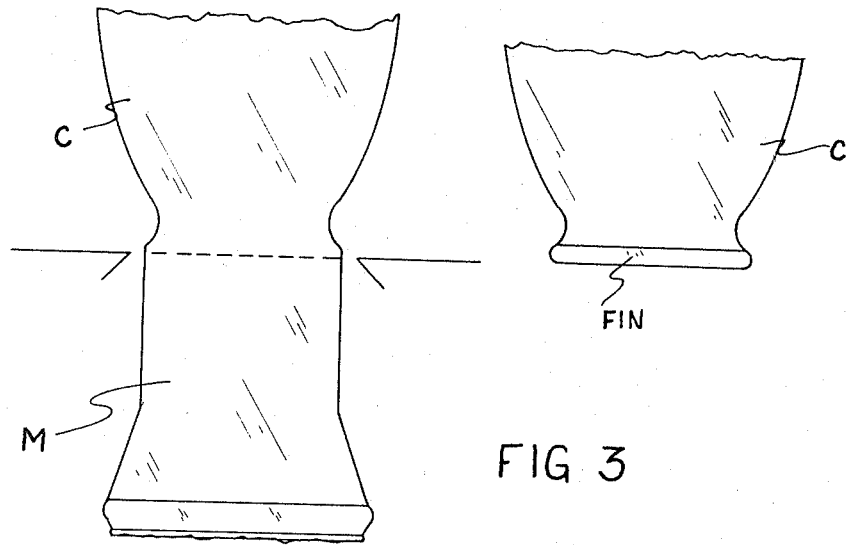
FIG 2
FIG 3
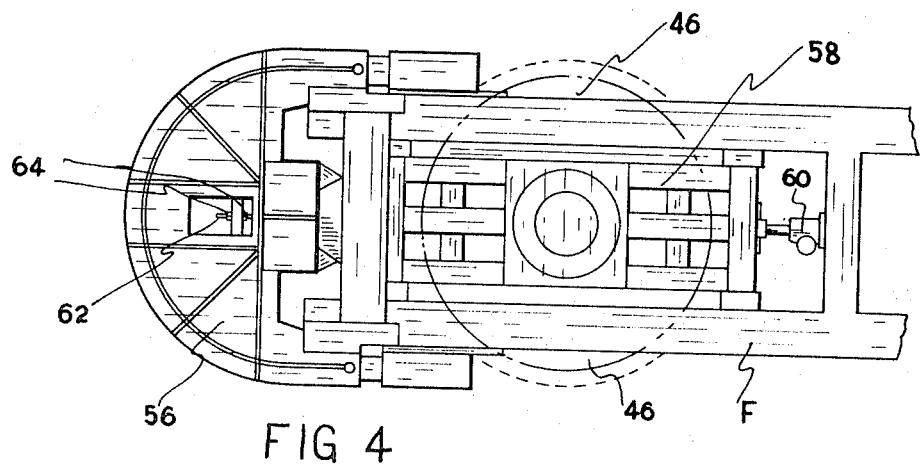
FIG 4

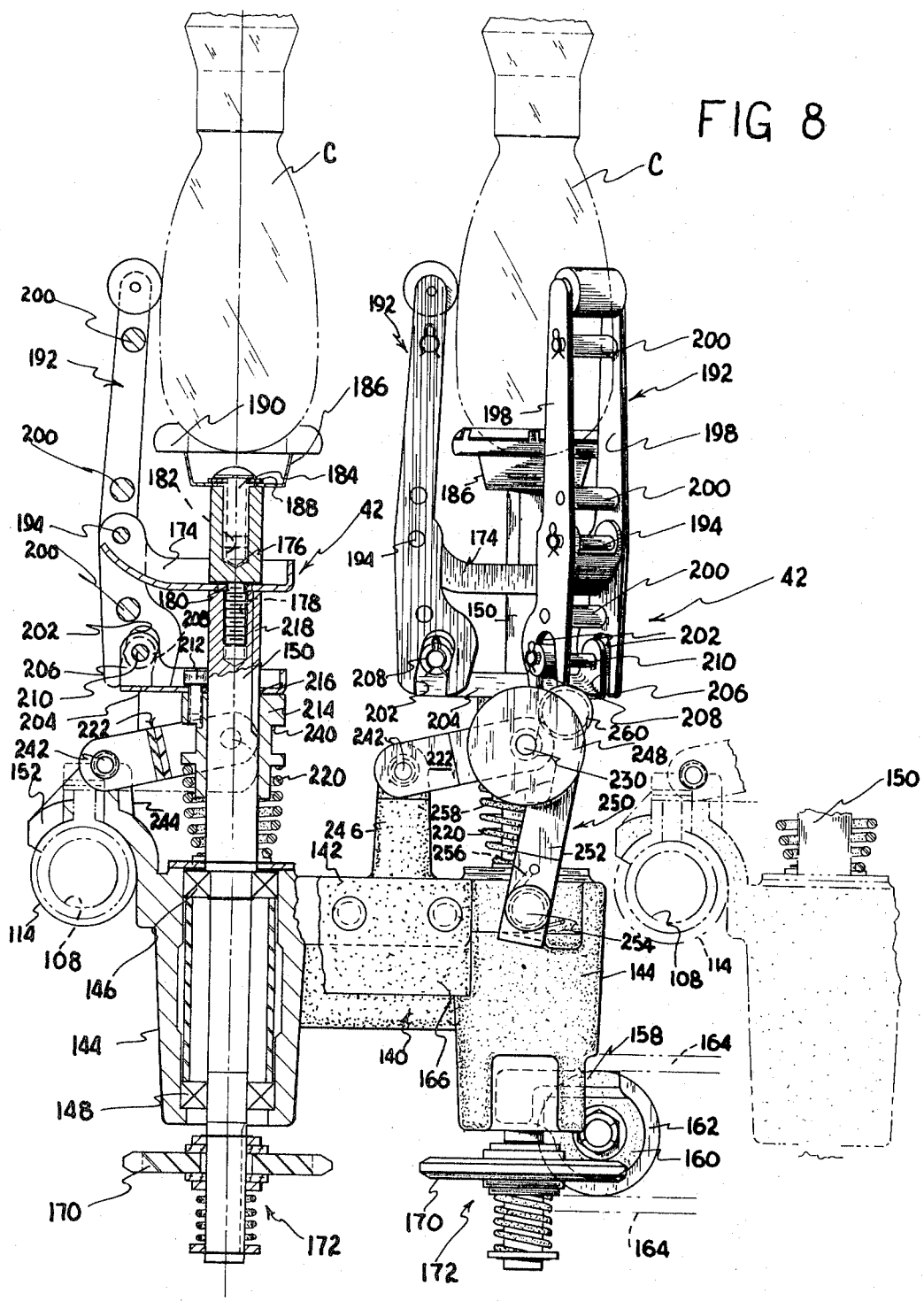

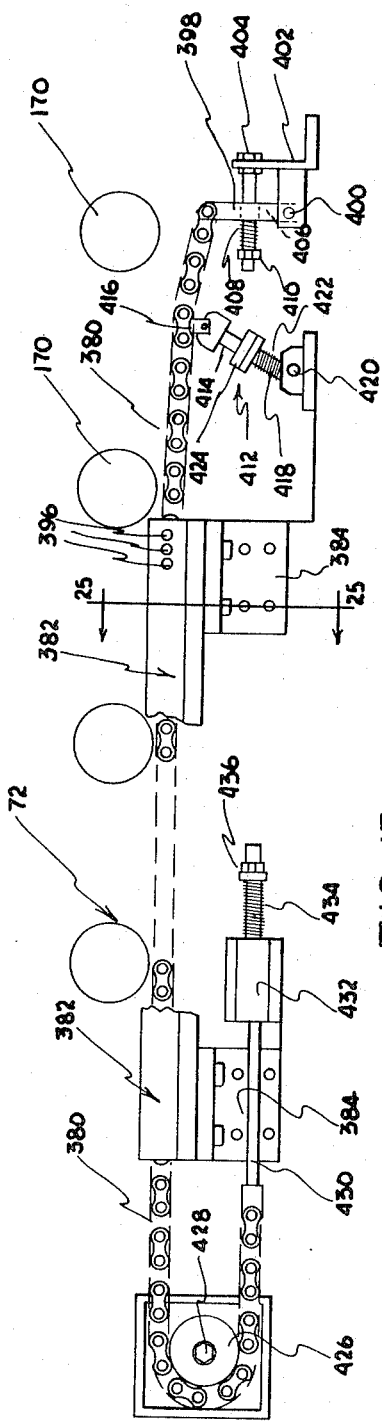
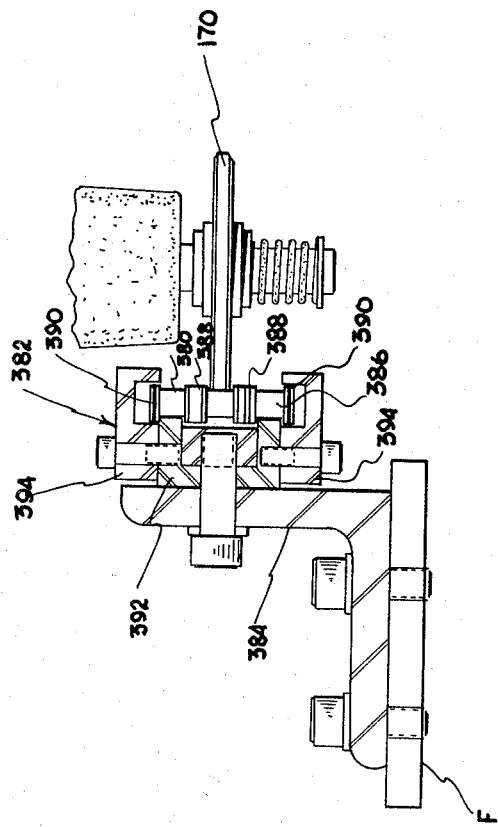
FIG. 13
FIG. 14

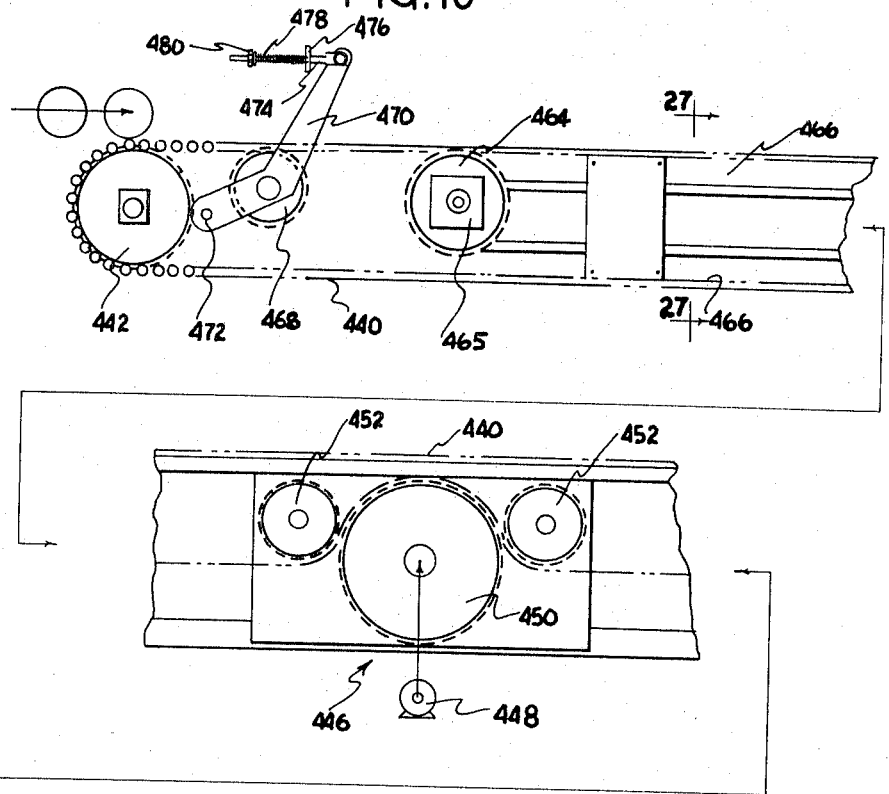
FIG. 15
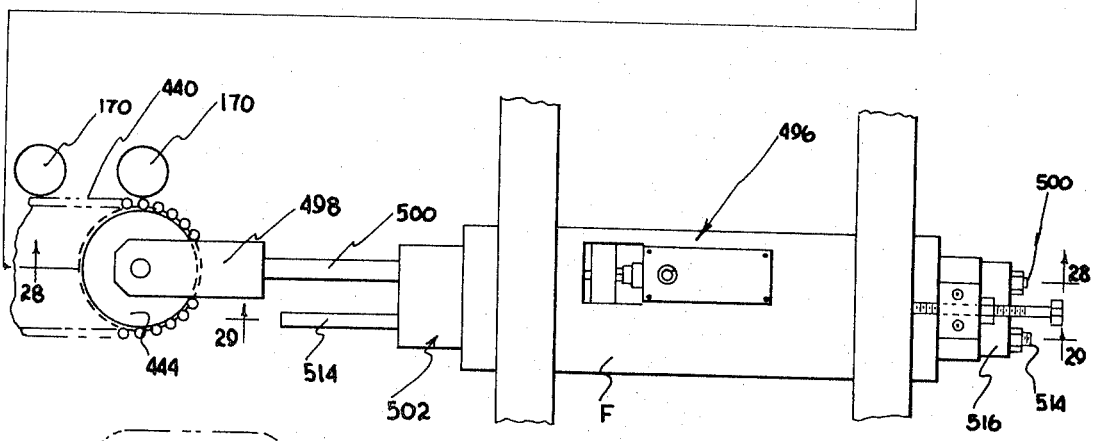
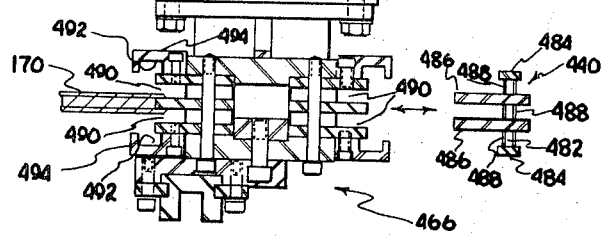
FIG. 16

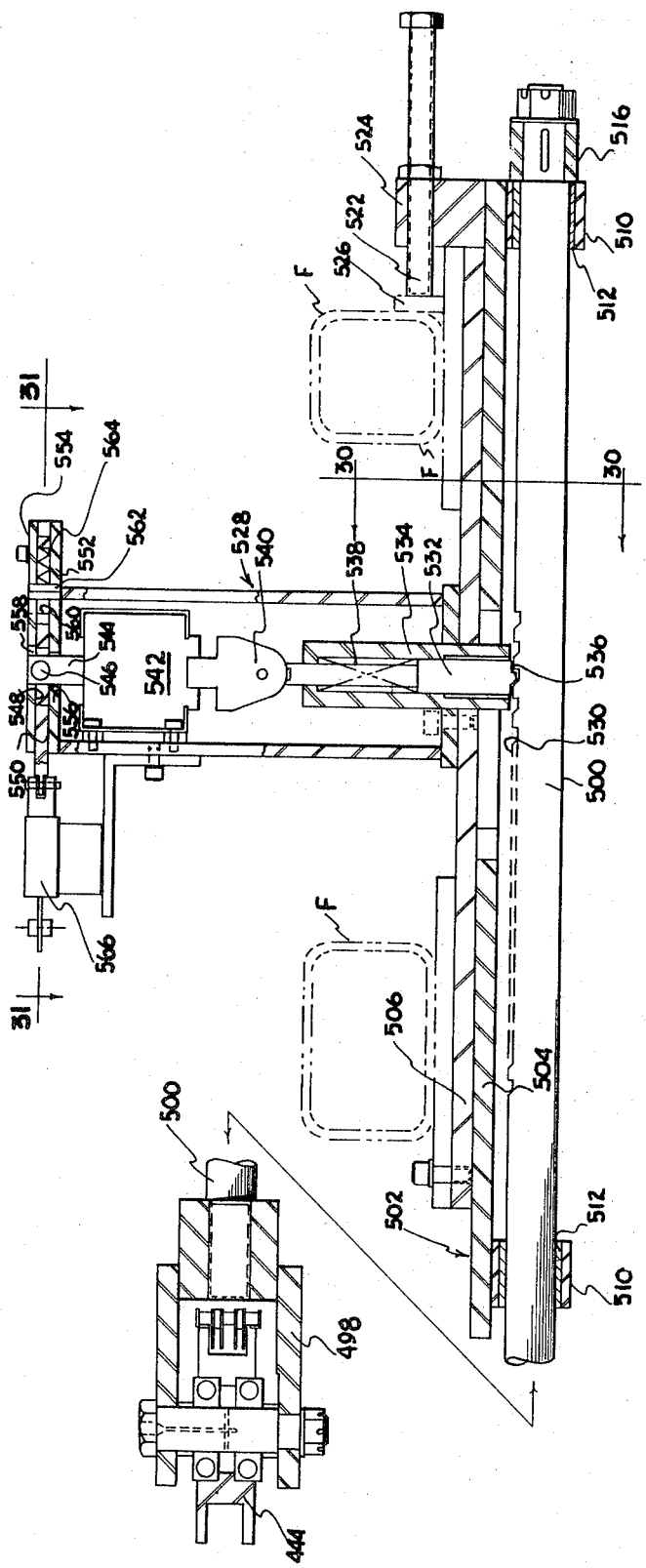
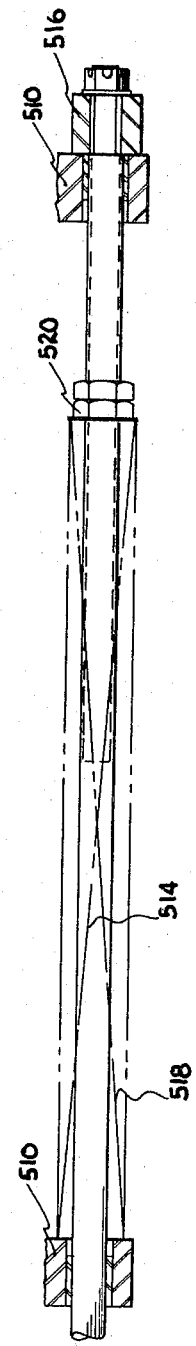
FIG. 17
FIG. 18

HANDLING APPARATUS FOR A HOLLOW GLASS ARTICLE

RELATED PATENTS AND APPLICATIONS

This application is a divisional of our copending parent application Ser. No. 77,425, filed Oct. 2, 1970 now Pat. No. 3,726,559.

The machine disclosed in this application forms a portion of the overall container production line disclosed and claimed in the commonly owned copending application of Richard A. Heaton, et al., Ser. No. 24,721, filed Apr. 1, 1970, now U.S. Pat. No. 3,703,363. Containers are loaded into the machine of the present invention by a transfer machine which forms the subject matter of another commonly owned copending application of John. D. Banyas, Ser. No. 825,850, filed May 19, 1969, now U.S. Pat. No. 3,590,982. The container which is handled by the machine of the present invention forms the glass portion of the composite container disclosed and claimed in Heaton's U.S. Pat. No. 3,372,826.

BACKGROUND OF THE INVENTION

As explained in detail in the aforementioned copending Heaton et al. Pat. No. 3,703,363, the glass container of Heaton Pat. No. 3,372,826 is initially formed in a ribbon-type forming machine with a moil or waste portion formed integrally with the container body and projecting upwardly from the container body. The purpose of the integrally formed moil is to enable the freshly formed container to be handled immediately upon its removal from the forming machine, at a time when the temperature of the freshly-formed container is so high that mechanical handling elements may mar or deform those portions of the container with which they come in contact. The transfer machine of the aforementioned Banyas Pat. No. 3,590,982 is designed to take the freshly formed containers from the ribbon machine by grasping the moil portion of the freshly formed containers, thus avoiding contact with that portion of the article which will form the ultimate finished container.

The function of the present machine and method is to receive the containers with the integrally formed moil from the transfer machine of Banyas Pat. No. 3,590,982, to sever the moil portion and to form the container finish after the moil has been severed.

SUMMARY OF THE INVENTION

The apparatus of the present invention takes the form of an endless chain conveyor driven in continuous movement along an endless path and carrying a series of uniformly-spaced container chuck assemblies. The endless path includes vertically aligned horizontal upper and lower runs interconnected by end turn sections, with the chuck assemblies being adapted to support the containers in an upright position on the upper run and in an inverted position on the lower run. The conveyor chain is formed with uniformly-spaced transverse link pins, with the chuck assemblies being coupled at their forward end to each link pin. Each chuck assembly includes two similar chucks, one behind the other and in order to minimize the change in acceleration as the elongate chuck assemblies move between linear portions of their path and the curved end turn sections, parabolic merging sections are employed at the inlet and outlet ends of each end turn section.

The chain is guided throughout its endless path by fixed guide tracks. A main drive sprocket meshes with both the upper and lower runs of the chain adjacent to, but spaced from one of the end turn sections. The main drive sprocket is driven by a motor which is synchronized with the drives of other machines of the production line, such as the transfer machine which loads containers onto the machine of the present invention and the pocket conveyor which receives containers from the present machine.

In addition to the main drive sprocket, a second or slave drive sprocket is meshed with the lower run of the chain near the opposite end of the lower run. The slave drive sprocket is driven by a constant speed motor through an eddy current or slip clutch at a speed which tends to drive the chain faster than it is driven by the main drive sprocket, the excess power being absorbed in the slip clutch to apply a predetermined degree of tension to the lower run of the chain between the two sprockets. The main drive sprocket and its adjacent end turn are mounted for horizontal adjustment to further adjust chain tension and the end turn section adjacent the main drive sprocket is further mounted for horizontal adjustment relative to the main drive sprocket to regulate tension of the chain passing around this end turn.

Containers with integrally formed moil portions are loaded onto the individual chucks in an upright position at a loading point on the horizontal upper run of the endless conveyor. The chuck assemblies include a seat engageable with the bottom of the container and three symmetrically disposed releasable gripping fingers which engage the body portion of the container to grip and center the container with its axis coincident with an axis of rotation established for the chuck upon its chain carried chuck assembly. The coincident axes extend in a true vertical direction on both the horizontal upper and lower runs. Each chuck includes a sprocket which is engageable with various chains mounted along selected portions of the chuck path to drive the chuck in rotation as it passes along the chain. A stationary chain engages the chuck sprockets on the upper run to drive the chucks and supported containers in continued rotation to achieve an even exposure of the containers to "pre-heat" burners extending along the upper run.

After the containers pass around the end turn section, they are inverted and move into a main burner section which produces a linear row of narrow flame jets which are directed accurately to a narrow band on the containers at the juncture of the moil portion and container body portion. During their passage through the main burners, the chuck sprockets are engaged by one run of an endless chain which is driven by a reversible variable speed drive in a direction and speed such that a selected rate of rotation of the containers is maintained during their passage through the main burners.

After leaving the main burners, the containers pass through a finish inspection station where they are rotated by a second stationary chain. Malformed containers are ejected from the line at this point by manipulating the chuck release mechanism to open the fingers, thus allowing the inverted container to drop freely from the chuck. After passing beyond the inspection-rejection station, the chain moves onto a downwardly inclined section of its path to lower the containers partially into pockets on a pocket conveyor driven in synchronism and alignment with the containers at this section of their path. As stated above, the forward end of each chuck assembly is supported upon a transverse link pin of the conveyor chain, and is supported so that it can be pivoted about the horizontal axis of the pin. A guide roller on the chuck assembly is engaged with a stationary track on the conveyor frame to control pivotal movement of the clutch assembly on the pin, and during their transit of the downwardly inclined portion of the chain path, the chuck assembly is pivoted to maintain the containers supported on the assembly in a true vertical position so that the containers are accurately partially inserted into the aligned pockets of the pocket conveyor. At the lower end of the downwardly inclined section of their path, a chuck release mechanism actuates the chucks to open the gripping fingers to drop the containers freely the remaining distance into the aligned pockets.

The chuck mechanism includes a latch automatically operable to retain the fingers in their open position, thus allowing a momentary actuation of the release mechanism at the normal release point or at the rejection station.

The opened chucks pass around the second end turn onto the upper run of the conveyor and again reach the loading point. The chucks remain latched in their open position until after a container has been lowered between the open gripping fingers. At the outlet end of the loading station, an actuator on the conveyor frame unlatches the chucks, allowing the gripping fingers to move to their closed position.

Although the machine and method are specifically described in terms of handling a specific glass container, the invention is equally capable of handling other types of glass containers or hollow glass articles initially formed as a blank with an integral moil, such as electric light bulb envelopes or glass tumblers, for example.

Other objects, features and advantages of the invention will become apparent in the following specification and in the drawings.

IN THE DRAWINGS:

FIG. 2 is a partial side detail view of the finish end portion of a container blank as received by the burn-off machine;

FIG. 3 is a detail side elevational view of the finish portion of the container after the finish has been formed by the burn-off machine;

FIG. 4 is a side elevational view, with certain parts broken away or omitted, showing details of conveyor chain tension adjustments;

FIG. 8 is a detail side elevational view, partially in section, of the chuck assembly;

FIG. 13 is a plan view, with certain parts broken away or omitted, of a stationary spin cycle chain;

FIG. 14 is a detailed cross-sectional view taken on line 25—25 of FIG. 13;

FIG. 15 is a plan view, with certain parts broken away or omitted, of the variable speed spin cycle mechanism;

FIG. 16 is a cross-sectional view taken on line 27—27 of FIG. 15;

FIG. 17 is a cross-sectional view taken on line 28—28 of FIG. 15;

FIG. 18 is a cross-sectional view taken on line 29—29 of FIG. 15;

GENERAL DESCRIPTION

The function of the burn-off machine of the present invention is to receive containers C (FIGS. 2 and 3) having an integral moil or waste portion M projecting upwardly from the container finish, to burn off the moil M and form a beaded finish FIN (FIG. 3) on the container, and to subsequently deposit the container into a pocket conveyor.

The burn-off machine forms a part of the overall container production line which is the subject matter of a commonly owned copending application of Richard A. Heaton et al., Ser. No. 24,721 filed Apr. 1, 1970 now Pat. No. 3,703,363. In this particular production line, the bulb-shaped containers are formed on a ribbon machine with an integral moil portion projecting upwardly from the container mouth or finish. The containers are severed from the ribbon on the ribbon machine at the top of this moil portion and the moil portion is sumultaneously grasped by a finger assembly on a transfer machine which forms the subject matter of Pat. No. 3,590,982. The finger assembly of the transfer machine is adapted to grasp the freshly formed container by the moil portion, because at the time the container is engaged by the transfer machine, it is still a relatively high temperature from the forming operation and susceptible to being marred or deformed by the finger assemblies of the transfer machine. To complete the container, it is necessary that the moil portion be subsequently severed from the container and that a beaded finish be formed at the point of severance.

Figure 1:
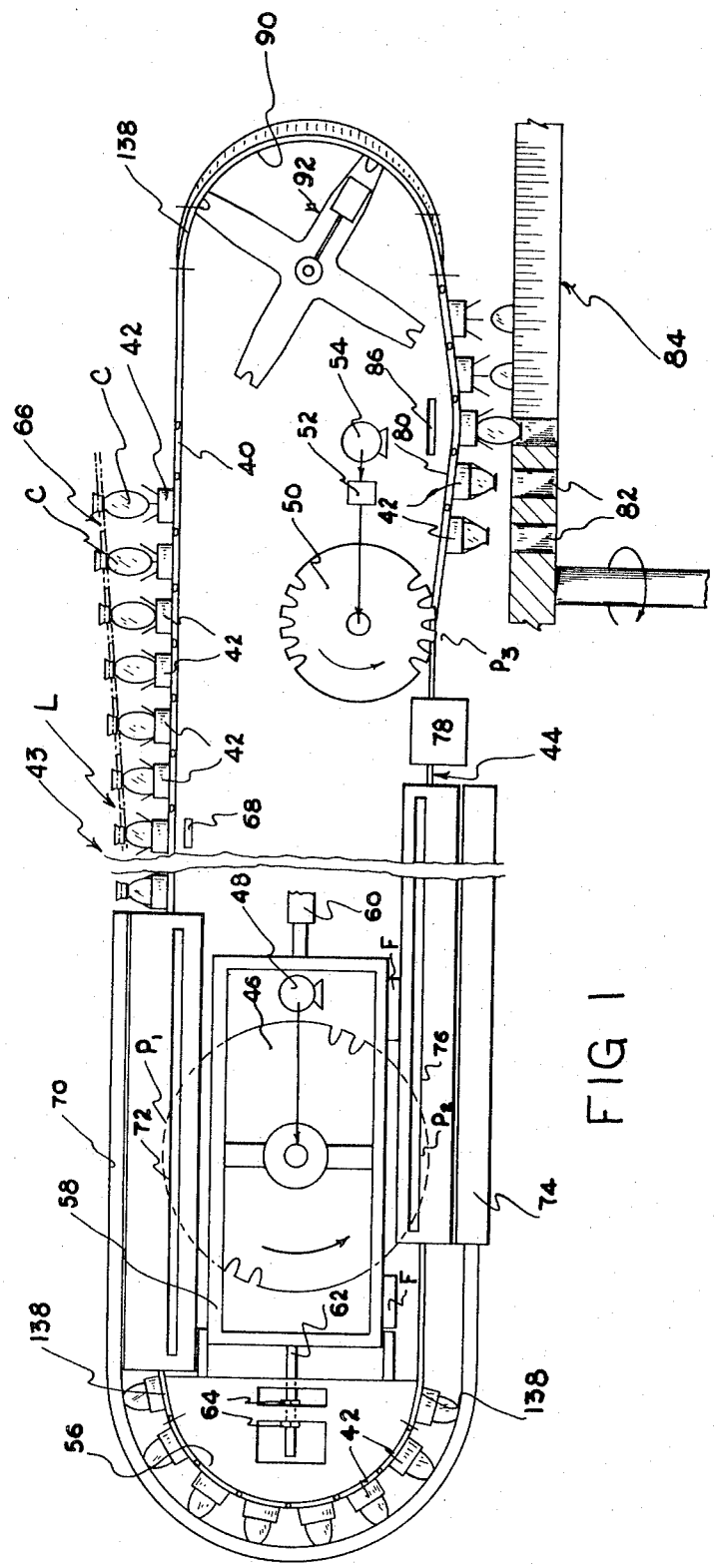
FIG. 1 is a very schematic side elevational diagram of a burn-off machine embodying the present invention.

In FIG. 1, an extremely schematic diagram of the burn-off machine is presented for the purpose of affording an overall view of the machine and the relationship of the individual mechanisms and components to each other. The various components and mechanisms will be individually described in detail below, their relative sizes and locations being such that it is not possible to show details of all mechanisms in a single view.

Referring to FIG. 1, the burn-off machine takes the form of an endless chain conveyor, the chain of which is schematically illustrated at 40. A series of uniformly spaced container chucks 42 are mounted upon and carried by the chain in continuous movement along the endless path having horizontally extending upper and lower runs 43 and 44 respectively. Chain 40 is supported and guided in movement along its endless path by chain tracks mounted upon the machine frame F, not shown in FIG. 1, but described in greater detail below. Chain 40 is driven along its endless path in a counterclockwise direction as viewed in FIG. 1 by a main drive sprocket 46 driven in in turn by a main drive motor 48, and also by a slave drive sprocket 50 which is drivingly coupled through a slip clutch 52 to a slave drive motor 54.

Main drive sprocket 46 is meshed with both the upper and lower run of chain 40 at points P-1 and P-2 and supplies the major portion of the driving force for chain 40. The remaining minor portion of the necessary driving force is supplied by slave drive sprocket 50 which is meshed with the lower run of chain 40 at point P-3 and driven by its drive motor 54 through slip clutch 52. Motor 54 is driven at a rate such that slave drive sprocket 50 attempts to move chain 40 at a faster speed than chain 40 is driven by main drive sprocket 46, part of the excess power being applied to tension chain 40 and the remainder absorbed in slip clutch 52. The purpose of slave drive sprocket 50, in addition to that of supplying a portion of the motive power to chain 40 is to maintain a constant tension in that portion of chain 40 on lower run 44 between points P-2 and P-3. By employing two drives, the magnitude of the chain tension is reduced - there are two drives each effectively pulling a short length of chain rather than a single drive pulling one long length of chain.

Overall tensioning of the chain is accomplished by mounting main drive sprocket 46 and that portion of the chain track defining the left-hand end turn 56 of the chain path upon a sub-frame 58 which is mounted for sliding movement from right to left and vice versa as viewed in FIGS. 1 and 4 upon the fixed frame F, of the burn-off machine. Sub-frame 58 can be shifted horizontally as viewed in FIG. 1 relative to the fixed frame as by a screw jack mechanism schematically illustrated at 60 to establish overall chain tension. Adjustment of sub-frame 58 relative to the fixed frame by the jack mechanism 60 establishes the tension of the major portions of the horizontal upper and lower runs 43 and 44 of chain 40 - i.e. that portion of the chains to the right of the points P-2 and P-3 enmeshed with sprocket 46. While it is desired to have an adequate amount of tension in the horizontal runs of the chain, it is desired to have the chain somewhat looser in its passage around end turn 56 and thus end turn 56 is in turn mounted upon sub-frame 58 for horizontal adjustment relative to sub-frame 58 by a threaded adjustment rod fixed to sub-frame 58 and coupled to end turn 56 by a pair of nuts 64.

Containers C are loaded upon chucks 42 of the burn-off machine by the transfer machine of the aforementioned Banyas Pat. No. 3,590,982 partially indicated at 66 in FIG. 1. The containers C, supported from their moil portion M upon transfer machine 66 are lowered into chucks 42 as the transfer machine and chucks move in synchronism to the left along upper run 43 of the burn-off machine. Support of the containers is transferred from transfer machine 66 to the individual chucks 42 at the loading point designated L on FIG. 1. As described in greater detail below, the chucks 42 include three container gripping fingers which are maintained in an open position until the container C is deposited by transfer machine 66 onto chuck 42, at which time the chuck fingers are closed by a closing mechanism schematically indicated at 68.

As the chucks 42 with their supported containers move to the left along upper run 43 away from loading point L, the containers pass between a pair of opposed elongate burners 70 which apply heat to the container around the region at which the moil portion is integrally joined to the container. Burners 70 are sometimes referred to as "pre-heat" burners although their function might be more accurately described as that of maintaining a controlled rate of cooling of the finish region of the container during its transit between loading point L and the location at which the moil is burned off. The containers, at the time they are received by the burn-off machine at loading point L are at a temperature of between 900° and 1000°F and at the commencement of the actual burning off of the moil it is desired to have the temperature of the container at between 800° and 900°F. Burners 70 can be regulated to achieve the desired temperature drop which would otherwise be dependent on such variable factors as ambient plant temperature, line speed, etc.

In order to achieve even exposure of the container around its entire circumference to the action of opposed burners 70, the container chucks and their supported containers are driven in rotation by an upper spin cycle device schematically indicated at 72. As indicated in FIG. 1, burner 70 is continued around end turn 56 and terminates at the upstream end of the main burn-off and finish forming burners 73. As the chucks enter the main burners 74, they are operatively engaged and again driven in rotation by a second spin cycle mechanism schematically indicated at 76.

As the chucks 42 with the supported containers pass around end turn 56, the container is moved into an inverted position, with the moil portion which is to be burned off now being at the lower end of the container as supported on the chuck so that the moil portion can drop freely from the container upon severance. Main burner 74 is constructed with a first or burn-off section of opposed burners which extend along the line of travel of the finish portion of the container and direct narrow high-intensity flame jets, in a manner to be described in more detail below, at the line of desired severance. During its passage between the main burners, the container is continuously driven in rotation at a controlled rate by spin cycle mechanism 76. The heat applied by the burners is adjusted so that severance of the moil portion from the container will occur when the container is approximately one half of the way through main burners 74. During the latter half of its passage through main burner 74, the burners continue to apply heat to the severed edge of the container and this heating action, combined with the rotation of the container by spin cycle mechanism 76, acts to form a beaded finish on the container.

After the containers pass beyond main burners 74, they are conveyed through an inspection station 78 which inspects the newly formed finish and is operable, by manipulation of the chuck 42, to cause ejection of a container having a malformed finish.

After passing to the right beyond inspection station 78, chain 40 and the supported chucks pass along a downwardly inclined portion 80 of the chain path to lower the inverted containers partially into container receiving pockets 82 of a schematically illustrated pocket conveyor 84 driven in synchronism with chucks 42 of the burn-off machine. Chucks 42 are constructed in a manner to be described in more detail below, so that during their passage along inclined section 80, the containers are maintained in a vertical position for free entry into pockets 82. A chuck opening mechanism schematically illustrated at 86 causes the chucks to open at the lower end of inclined path section 80 to release the container to permit it to freely drop the remaining distance into the aligned pocket 82 of conveyor 84.

During its passage around the right-hand end turn 90 of its endless path, chain 40 passes into operative relationship with a chain lubricating mechanism designated generally 92 which is periodically actuated, in a manner to be described in greater detail below, to lubricate the chain.

CHAIN AND TRACK CONSTRUCTION

Figure 5:
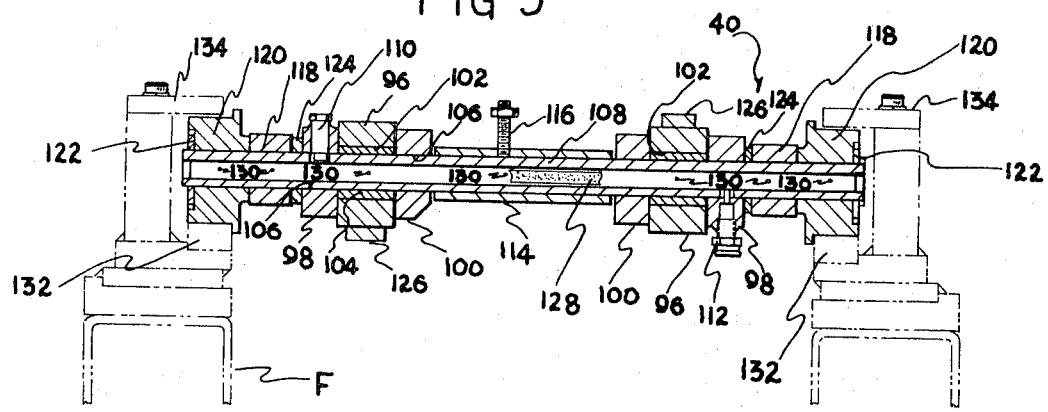
FIG. 5 is a detail cross-sectional view, taken on line 5—5 of FIG. 6, showing details of the link pin construction.
Figure 6:
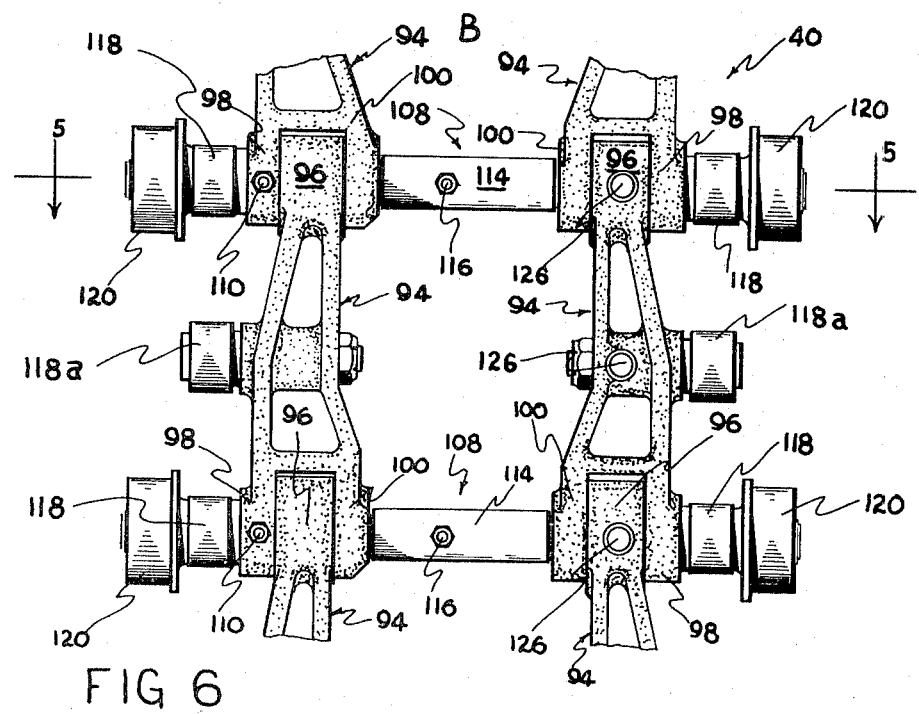
FIG. 6 is a detail plan view of a portion of the main conveyor chain of the burn-off machine.

The structure of endless chain 40 is best shown in FIGS. 5 and 6. Referring first to FIG. 6, chain 40 includes a plurality of pairs of transversely spaced rigid links designated generally 94, each formed with an integral single hub 96 at one end and a pair of transversely spaced hubs 98, 100 at its opposite end, the spacing between hubs 98 and 100 being dimensioned to slidably receive a hub 96. Links 94 on the right and left-hand sides of the chain as viewed in FIG. 6 are identical, the links 94 on the right-hand side of the chain being inverted with respect to the links on the opposite side of the chain. Thus, the hubs 100 are always disposed inwardly of the single hubs 96, while the hubs 98 are always located outboard of the single hub 96.

Referring now to FIG. 5, it is seen that hub 96 is bored as at 102 and a plain bearing 104 is mounted within this bore. Hubs 98 and 100 are coaxially bored as at 106, the successive links being coupled to each other by a hollow link pin 108 which passes through bores 106 of the spaced hubs 98, 100 and through bushing 102 of the single hubs 96. Link pin 108 is freely rotatable within the bushings 102, however, to minimize wear on the pin, hubs 98 and 100 are locked to pin 108 by a plain set screw 110 at the left-hand side of the chain as viewed in FIGS. 5 and 6.

A tubular sleeve 114 is mounted for free rotation and a small degree of limited axial movement on pin 108 between the inner link hubs 100. A threaded stud 116 is fixedly secured to and projects radially outwardly from sleeve 114.

Link pin 108 projects axially outwardly beyond the outer hubs 98 of the links to rotatably support a pair of drive rollers 118 and a pair of support rollers 120 at locations outboard of links 94.

Referring to FIG. 6, an intermediate drive roller 118a is rotatably mounted on each link 94 midway between each pair of pin supported drive rollers 118.

Synchronizing buttons 126 are integrally formed on each single link hub 96 and also upon the midpoint of each link. Buttons 126 are employed in a synchronizing system which synchronizes the speed of all of the various machines in the production line of Heaton et al. application Ser. No. 24,721.

a lubricant wick, partially indicated at 128, is mounted in the hollow interior of link pin 108 to transfer lubricant supplied to fitting 112 in a manner to be described in detail below, over the entire interior of pin 108. The lubricant is in turn transferred from wick 128 to the rotary bearing surfaces of the link pin via radial bores 130.

Figure 7:
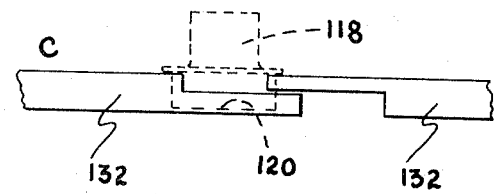
FIG. 7 is a partial plan view showing an expansion joint employed in the chain supporting track.

The endless chain 40 is supported and guided in movement by its support rollers 120 which ride on track sections 132 mounted on the fixed frame F of the machine. Because of the extreme temperature differences between periods of operation and non-operation, the machine frame F and tracks 132 are constructed in a plurality of individual sections, with thermal expansion joints of the type illustrated in FIG. 7 between adjacent track sections.

The support track section including track 132 illustrated in FIG. 5 is a typical section, the particular portion shown being that at some point of one of the horizontal runs of the conveyor. The end turn sections of the track are functionally similar and constructed by fixedly mounting inner and outer track sections 132 and 134 onto a rigid plate such as 136.

As will be described in greater detail below, the chuck assemblies of the machine are carried by chain 40 within the space between links 94 and adjacent link pins 108. This requires link 94 to be of fairly substantial length, and the center-to-center distance between successive link pins 108 is approximately 10 inches. While the links 94 are traveling along the horizontal portions of their path, during normal operation of the machine the links more at constant velocity. During their transit around the curved end turns 56 and 90, the links move along a curved path and hence are subjected during their passage around the end turns to a fairly substantial centripetal acceleration, the magnitude of which is dependent upon the chain velocity and the radius of curvature of the end section. This acceleration can be reduced by making the radius of curvature of the end turn larger, however from the standpoint of manufacturing economy there are practical limits to this approach.

In order to emply end turn sections of a relatively small radius, the chain tracks 132, 134 at the entry and exit of each end turn include a section 138 (FIG. 1) which follows a parabolic path having a constantly changing radius of curvature at the juncture of section 138 with the adjacent straight track section to the radius of the constant radius of curvature section of the respective end turns. This gradual transition enables the centripetal acceleration imparted to the link as it enters the curved section to increase or decrease over a finite period of time rather than suddenly changing from a zero centripetal acceleration on the straight track section to a maximum centripetal acceleration as would be the case if the straight track section merged directly with a curved section of constant radius.

In a system where links of substantial length, such as the links 94 of the present machine, should the links pass directly from a straight track section to a curved section of relatively small radius, a whipping or chattering of the links will occur as they pass the transition point because one end of the link is suddenly subjected to a centripetal acceleration of substantial magnitude, while the trailing end of the link is still on a straight section of the path and not subjected to this acceleration. Particularly where the links, as will be described below, are carrying a chuck assembly of fairly substantial mass compared to that of the links, this sudden whipping or chattering is undesirable, because it is a periodic type of vibration which can approach resonance at certain critical chain speeds.

Parabolic track sections 138 minimize this problem by enabling the centripetal acceleration to be applied gradually, rather than suddenly.

CHAIN DRIVE AND TENSIONING ADJUSTMENTS

As set forth above in the general description, the endless chain 40 is driven in movement along its endless path by two separate drives, one of which includes the main drive sprocket 46 and the other of which includes the slave drive sprocket 50. Main drive sprocket 46 engages chain 40 at two vertically aligned points P-1 and P-2 chain, while slave drive sprocket 50 engages the chain at a single point P-3 on the lower run of the chain.

Main drive sprocket 46 is driven by a main drive motor 48 whose speed is synchronized (by a control system including the buttons 126 on chain 40) with the speed of other machines in the production line, specifically transfer machine 66 and pocket conveyor 84. Slave drive sprocket 50 is driven by a constant speed motor 54 which is drivingly connected to sprocket 50 through an eddy current or slip clutch type coupling. The speed of motor 54 is such that it always tends to drive chain 40 at a speed faster than that at which the chain is driven by main drive sprocket 46. A portion of the excess power exerted by motor 54 is employed to apply tension to that portion of the chain between points P-2 and P-3 of FIG. 1, while the remaining excess power supplied by motor 54 is absorbed in the eddy current coupling 52. A constant tension is desired along that portion of the path between points P-2 and P-3, because it is along this portion of the path that the containers pass through the main burner 74 where the moil is severed and the container finish FIN is formed. The severing and finish forming operations call for a very precise positioning of the container relative to the burners, and it is thus necessary that the chain be firmly tensioned during these operations so that all possible lost motion in the chain is taken up.

During its passage around the curved end turns, on the other hand, the high tension applied to the chain during its passage through the main burners is undesirable, because it tends to interfere with the desired flexing of the chain. Referring to FIG. 1, it will be noted that the three points of engagement between chain 40 and sprockets 46 and 50, namely points P-1 and P-2 and P-3 effectively provide points at which the chain tension can be changed.

The overall chain tension is adjusted by manipulation of jack 60 to shift sub-frame 58, which carries main drive sprocket 46, and end turn 56 from right to left or vice versa as viewed in FIGS. 1 and 4. End turn 90 at the opposite end of the machine is fixed, and thus adjustment of sub-frame 58 and sprocket 46 to the left as viewed in FIGS. 1 and 4 will increase the tension in chain 40 from point P-2 around end turn 90 to point P-1. The initial tension in the remaining portion of the chain - i.e. that from point P-1 around end turn 56 to point P-2 is independently adjusted by shifting end turn 56 from right to left or vice versa relative to sub-frame 58 by positioning nuts 64 on the threaded adjustment rod 62 mounted on sub-frame 58. These adjustments are made during the initial startup of the machine to establish what might be termed the normal or reference chain tensions, the term tensions being employed in the plural to indicate the fact that the tension in chain 40 as it passes around end turn 56 may be different than the tension in the chain as it passes around end turn 90.

Under normal operating conditions, the total driving force applied to the chain is distributed between sprockets 46 and 50 in a manner such that approximately 60% of the total driving force is supplied by sprocket 46, while the remaining 40% is derived from sprocket 50. The two points of engagement of sprocket 46 with chain 40 enable the application of a substantially reduced tension in chain 40 as it passes around end turn 56 between points P-1 and P-2, while the location of slave drive sprocket 50 just before end turn 90 enables the chain tension around end turn 90 to also be reduced.

CHUCK ASSEMBLY

Figure 9:
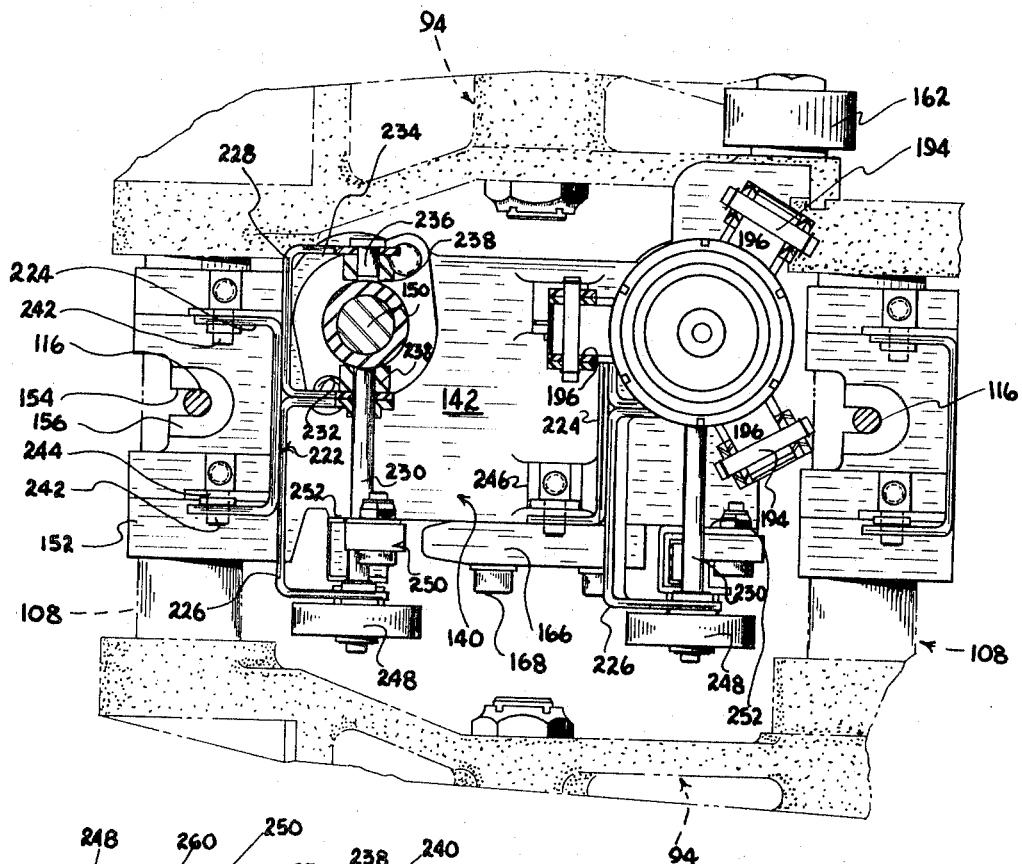
FIG. 9 is a detail plan view, partially in section, of the chuck assembly.
Figure 10:
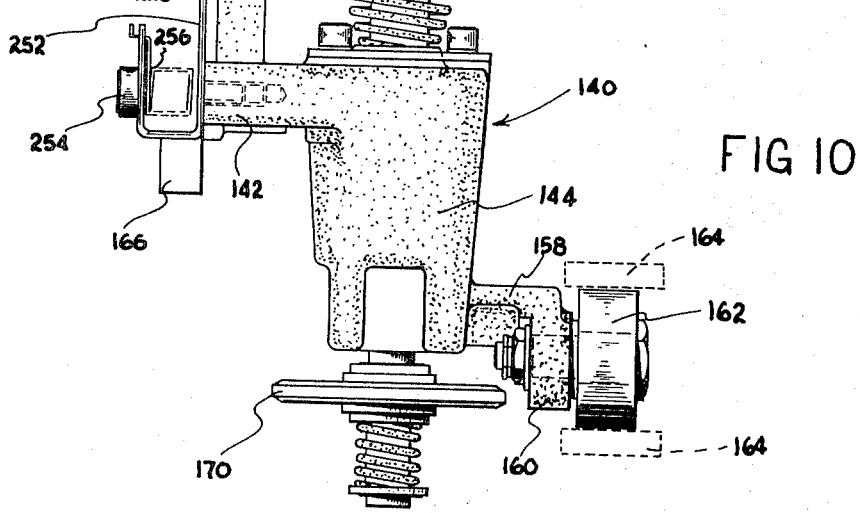
FIG. 10 is a rear view of a portion of the chuck assembly.

The structural details of the container chuck assemblies are best shown in FIGS. 8 through 10. As most clearly seen in FIG. 8, each chuck assembly includes a pair of chucks designated generally 42 which is mounted upon a common housing 140. Housing 140 is preferably formed as a unitary casting having a generally horizontal platform portion 142 formed with a pair of vertically elongated sleeve sections 144 which support, as by upper and lower bearing assemblies 146, 148 the central shafts 150 of the individual chucks.

At its forward end, housing 140 is formed with an integral semi-cylindrical mounting tongue 152 which is shaped and dimensioned to be seated upon the sleeve 114 of a chain link pin 108. As best seen in FIG. 9, tongue 152 is formed with a recess 154 which receives the threaded stud 116 fixedly mounted on link pin sleeve 114, while a flat bearing surface 156 around recess 154 provides a bearing surface against which a nut threadably received on stud 116 can clamp the mounting lug 152 to the chain pin sleeve.

Figure 11:
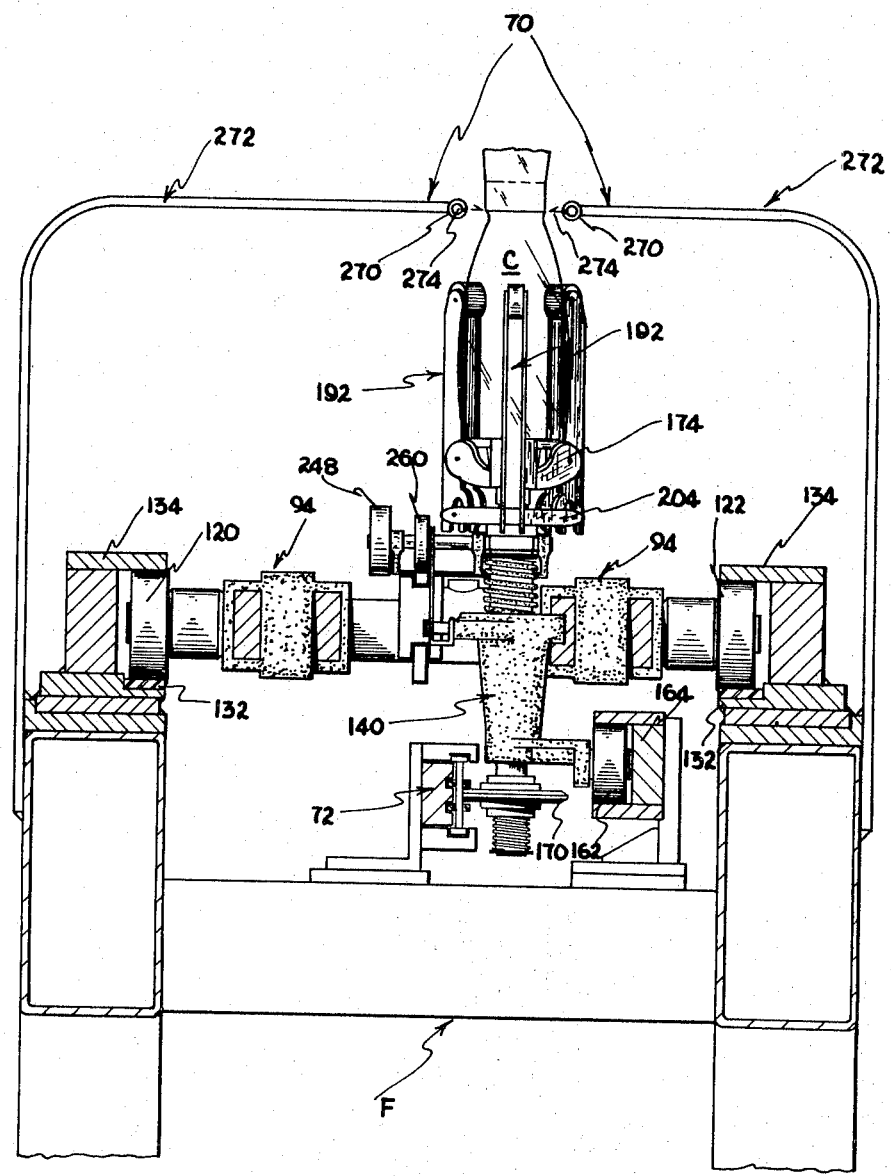
FIG. 11 is a detail cross-sectional view, taken on a vertical plane, showing a chuck assembly in the preheat burner along the upper run of the main conveyor.
Figure 12:
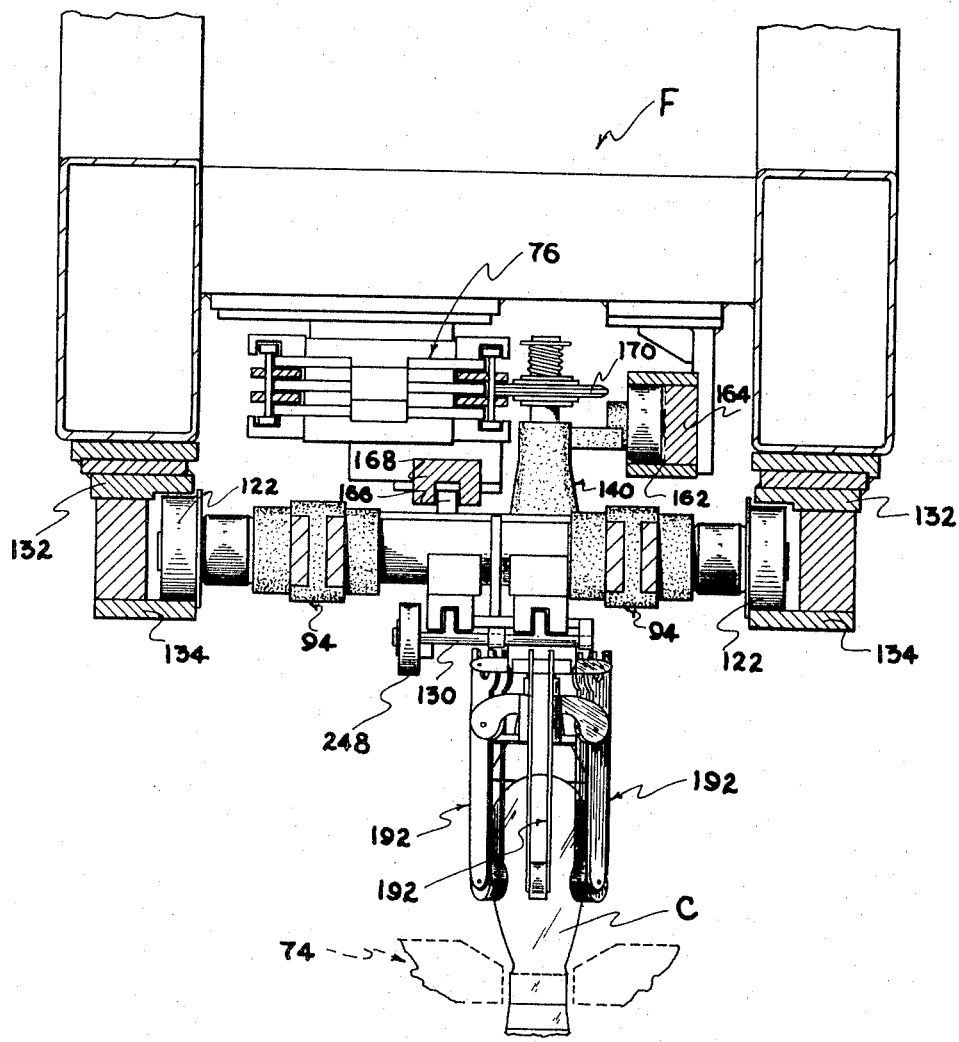
FIG. 12 is a detail cross-sectional view, taken in a vertical plane, on the lower run of the main conveyor, showing a chuck assembly passing along the lower spin cycle portion of its path.

Referring now to FIGS. 8 and 10, a projecting arm 158 is integrally formed on the outer side of the rearwardmost sleeve portion 144 and includes a hub 160 which rotatably supports a chuck support roller 162. Roller 162 rides in a track 164 (see also FIGS. 11 and 12) mounted upon the machine frame to control pivotal movement of housing 140 about the axis of the link pin which supports its forward end.

A guide shoe 166 is fixedly secured to one side of housing platform 142. Guide shoe 166 is employed in conjunction with guide tracks 168 (FIG. 12) mounted upon the machine frame and extending through the main burner section of the chain path to accurately locate the chucks transversely of the chain path during their passage through the main burners. The containers has very little side-to-side clearance during its passage through main burners 74 and it is thus necessary to accurately position the containers midway between the burners in order that the burners may act evenly on the container. As explained above, sleeves 114 are mounted on link pins 108 with a slight degree of axial play which is prohibited by guide shoe 166 and its cooperating track 168 during the passage of the chuck through the main burner assembly.

The two chucks mounted upon the common housing 140 are identical and independently operable.

Each chuck includes a main shaft 150, supported in a sleeve 144 of housing 140 for free rotation relative to the housing within bearings 146 and 148. The axis of rotation thus established is mutually perpendicular to the path of movement of chain 40 and to the axes of link pins 108. At various points along the path of movement of the chucks, the chucks are driven in rotation, by chains employed in spin cycle mechanisms 72 (FIG. 11) and 76 (FIG. 12), which engage a sprocket 170 coupled to shaft 150 by a conventional friction coupling designated generally 172.

At the upper end of shaft 150, a fulcrum plate 174 is fixedly clamped to the shaft by a threaded stud 176 which is received within a tapped bore 178 in shaft 150 and formed with a downwardly facing shoulder 180 which bears against the upper surface of plate 174. Preferably, some means, such as a tab, is provided to rotatably lock plate 174 against rotation relative to shaft 150. Stud 176 is formed with a tapped bore 182 in its upper end which threadably receives a container seat retaining bolt 184. Bolt 184 clampingly secures a container seat 186 and washer 188 to the extension of shaft 150 formed by stud 176. Container seat 186 includes an annular seat element 190 which is coaxially aligned with the axis of shaft 150 and conformed to engage the bottom of a container C to support, in cooperation with a group of three contaner-gripping fingers designated generally 192, the container C in coaxial alignment with the shaft axis.

The purpose of mounting fulcrum plate 174 and container seat 186 by means of stud 176, bolt 184 and washer 188 is to enable the chucks to be rapidly converted to handle different sized containers. While the main burners 74 which sever the moil and form the container finish are capable, as will be described below, of limited vertical adjustment upon the machine frame, the range of burner adjustment is a limited one. The path of movement of chain 40, and hence of chuck housings 140, is fixedly established by the chain support tracks 132, 134, and thus if containers C longer than those shown in FIG. 8 are to be handled upon the machine, container seat 186 must be located at a lower elevation in order to locate the container finish line at the same elevation as that of the short containers C shown in FIG. 8. This adjustment can be easily made by replacing the stud 176 shown in FIG. 8 with a shorter stud so that container seat 186 is lowered or located closer to the upper end of shaft 150. This adjustment is readily made by merely removing bolt 184, replacing stud 176 with a shorter stud 176 and then replacing bolt 184 in the new stud.

In some instances, it may be desirable to also replace fulcrum plate 174, which pivotally supports gripping fingers 192 upon fulcrum pins 194, to relocate the fulcrum point of fingers 192. Fulcrum plates 174 can easily be replaced by removing stud 176 (without disassembling the container seat) to enable the original fulcrum plate 174 to be detached, inserting a new fulcrum plate 174 and threading stud 176 back into shaft 150.

Referring to FIG. 9, it is seen that fulcrum plate 174 is formed with three radially projecting arms 196 spaced 120° apart from each other about the chuck axis and that the fulcrum pins 194 are supported in the outer ends of arms 196. Gripping fingers 192 each consist of a pair of side plates 198 secured in spaced relationship to each other as by a series of spacer pins 200. Arms 196 project between the spaced plates 198, and pins 194 project through the arms and adjacent plates 198 to support the finger for pivotal movement in a general plane which extends radially of the chuck axis.

At their lower ends, each of plates 198 is formed with a cam slot 202. An actuating plate 204 is formed with three radially projecting arms, each of which carries a pair of actuating rollers 208 which are received within the respective slots 202 on the lower end of the gripping fingers as best seen in FIG. 8. The overall configuration of actuating plate 204 is quite similar to that of fulcrum plate 174, although the actuating plate is somewhat smaller in its overall dimensions. As was the case with the fulcrum plate, the opposite side plates 198 of the gripping fingers pass on the outer sides of arms 206 of the actuating plate, and rollers 208 are mounted on the outer sides of arms 206 upon a common pin 210 rotatably supported in arm 206.

Actuating plate 204 is fixedly secured, as by bolts 212 to an actuating sleeve which is mounted upon shaft 150 for axial sliding movement relative to the shaft. A tab 216 on actuating plate 204 projects into a keyway 218 on shaft 150 to permit axial sliding movement of the assembled actuator plate 204 and sleeve 214 while locking these parts against rotation relative to shaft 150. A compression spring 220 resiliently biases sleeve 214 upwardly as viewed in FIG. 8.

In FIG. 8, gripping fingers 192 are shown in their closed container gripping position. Opening of the fingers to accomodate loading or unloading of containers from the chucks is accomplished by axially shifting sleeve 214 downwardly from the FIG. 8 position against the action of spring 220. It will be noted that the configuration of the cam slots 202 in the lower end of the gripping fingers is such that their innermost sections are inclined upwardly and inwardly relative to the chuck axis. Axial movement of sleeve 214 and its attached actuating plate downwardly causes rollers 208 to engage the inclined inner sides of slots 202 to force the lower ends of gripping fingers 192 inwardly as the rollers 208 are moved downwardly. Inward movement of the lower ends of fingers 192 pivots the fingers about their respective pins 194 to move the upper ends of fingers 192 outwardly clear of the container C.

Downward axial movement of sleeve 214 is accomplished by an actuating lever assembly designated generally 222 most clearly shown in FIGS. 9 and 10. Each lever 222 is constructed from three U-shaped elements 224, 226 and 228 which are fixedly secured to each other, as by tack welding with a U-shaped element 224 opening forwardly and elements 226 and 228 opening rearwardly and secured in side-by-side relationship to the bight portion of element 224.

A shaft 230 is mounted in and projects through both legs of U-shaped member 226 and also through the leg 232 of U-shaped member 228 which is adjacent member 226. The opposite leg 234 of U-shaped member 228 carries a stub shaft 236 which is coaxially aligned with shaft 230. Stub shaft 236 and shaft 230 each support one of a pair of rollers 238 at the inner side of the opposed legs 234 and 232 of member 228, rollers 238 in turn being located within an annular groove 240 formed on sleeve 214. Levers 222 are pivotally supported on chuck housing 140 by a pair of spaced aligned pivot pins 242 mounted in front or rear projections 244 or 246 integrally formed on housing 242.

Because the biasing action of spring 220 normally maintains sleeve 214 in the position shown in FIG. 8, the interengagement between the walls of annular groove 240 and rollers 238 on lever 222 normally maintains lever 222 in the position shown in FIG. 8.

Depression of the lever - i.e. in clockwise pivotal movement about its pivot 242 from the FIG. 8 position is accomplished by the engagement between an actuating roller 248 rotatably mounted on the outer end of shaft 230 with a cam located on the machine frame at an appropriate location along the path of movement of the chuck. When roller 248 engages such a cam, it is depressed to swing levers 222 in clockwise pivotal movement from the FIG. 8 position, this pivotal movement causing rollers 238 to engage the lower wall of groove 240 to drive sleeve 214 axially downwardly on sahft 150 against the action of spring 220. Downward movement of the sleeve, as described above, carries rollers 208 downwardly within cam slots 202 of the gripping fingers to swing the fingers concurrently to their open position.

Shifting of the gripping fingers 192 from their closed position shown in FIG. 8 to their open position is accomplished at either of two locations on the lower run of the machine while the chuck assemblies are in an inverted position. Referring briefly to FIG. 1, it will be recalled from the general description above that the containers are subjected to a finish inspection at inspection station 78 and that containers having an improperly formed finish are ejected from the machine at this point. The inspection-rejection device at station 78 forms no part of the present invention, and may take the form of any of several well-known devices operable for this purpose. In brief, the inspection device is operable to generate a reject signal upon the detection of a sub-standard container, and the reject signal is employed to actuate an ejector which, in this particular case, will project a cam member into the path of the actuating roller 248 on the chuck carrying the flawed container.

As is apparent from FIGS. 8 and 9, rollers 248 on adjacent chucks are not spaced too far from each other (approximately 5 inches in practice) and thus the cam element of the reject device must be moved rapidly into and out of the path of movement of rollers 248 so that it strikes only the roller 248 on the chuck carrying the flawed container and is withdrawn clear of the path of movement of the rollers before the next subsequent roller reaches the reject station. This requirement in turn permits only a momentary depression of the lever 222 which may not hold gripping fingers 192 open long enough to permit the container to drop from the inverted chuck clear of the fingers.

To assure adequate time to allow ejected containers to drop clear of the chuck, and further for the practical reason that once the fingers are open there is no need to close them again until a new container has been inserted into the chuck at loading station L on the upper run of the conveyor, the chucks are constructed with a latching mechanism designated generally 250 which is automatically operable to releasably latch levers 222 in their lowermost or chuck open position. Mechanism 250 includes a lever 252 pivotally mounted on chuck housing 140 adjacent each chuck as by pivot pins 254. A torsion spring 256 resiliently biases lever 252 in a counterclockwise direction as viewed in FIG. 8. When the associated actuating lever 222 is in its upper or chuck closed position, the upper end of lever 252 is resiliently biased against shaft 230 which is carried on lever 222. When lever 222 is depressed to open the chuck, its shaft 230 is carried downwardly along the front edge of lever 252 into alignment with a latching notch 258 (FIG. 8) on the lever which engages shaft 230 to latch actuating lever 222 in its lower or chuck open position.

Reclosing of the gripping fingers at the container loading station L is accomplished by a stationary cam on the machine frame which releases the latch and engages roller 248 to achieve a cushioned closing of the fingers.

PRE-HEAT AND MAIN BURNER ASSEMBLIES

Details of the pre-heat and main burner assemblies are disclosed in Pat. No. 3,726,559, of which this application is a division, and are also the subject matter of a copending divisional application Ser. No. 284,565, filed Aug. 29, 1972.

SPIN CYCLE MECHANISM

Two types of spin cycle mechanisms are employed to drive the chucks in rotation during their passage through pre-heat burner 70 and main burners 74. Spin cycle mechanism 72, which extends along the upper run portion of pre-heat burner 70 takes the form of a stationary chain mounted alongside the path of movement of chuck sprockets 170 to engage the sprockets as their chucks traverse this portion of the path. The rate of rotation of the chuck and its supported container, by spin cycle mechanism 72, is thus directly dependent upon the line speed of the chuck. The rate of rotation of the container during its passage through the pre-heat burner 70 is not overly critical, because the sole requirement is that the container be more or less uniformly exposed around its circumference to burners 70.

The rate of rotation of the containers as they pass through main burner 74, where the moil severing and finish forming operations are performed, is more critical, and spin cycle mechanism 76 takes the form of a endless chuck sprocket engaging chain which is driven by a reversible variable speed drive motor so that the rate of rotation of the containers may be varied in accordance with the algebraic difference of the chuck and chain speeds.

Spin cycle mechanism 72 is shown in FIGS. 13 and 14. It includes a length of sprocket chain 380 which is supported over most of its length within a chain track or support designated generally 382 which in turn is supported upon the fixed frame F of the machine by suitably spaced mounting brackets 384. Chain track 382 extends alongside the path of movement of chuck sprockets 170 to maintain chains 380 in engagement with chuck sprockets 170, the forward motion of the sprockets causing the stationary chain to drive the sprockets in rotation as they move from right to left as viewed in FIG. 13.

Referring to the cross-sectional view of FIG. 14, it is seen than chain 380 includes a plurality of pins such as 386, which interconnect an inner pair of spaced links 388 and a pair of outer links 390. The chain is supported in track 382 with its pins in a vertical position by a central track member 392 of generally E-shaped cross-section which is secured to and supported upon mounting brackets 384 and upper and lower retainer strips 394 of channel-shaped cross-section which are fixedly secured, as by bolts, not shown, to track member 392. At the upstream end (right-hand end as viewed in FIG. 13) of chain track 382, three adjacent chain pins 386 are replaced by pins of extended construction 396, the pins 396 extending through all of the chain links and being received within aligned bores which pass vertically through the retainer members 394 to fixedly anchor the chain to track 382 at this point. Otherwise, the chain merely rests within the rack 394 in the manner shown in the cross-sectional view of FIG. 14.

The purpose of anchoring chain 380 by means of pins 396 is twofold. It enables different degrees of tension to be applied to those sections of chain 380 to the left and to the right of pins 396 and also serves as a fixed anchoring point to isolate the tension of the chain at one side of pins 396 from the tension of the chain on the opposite side of pins 396. These two features are both related to achieving a satisfactory initial engagement between the moving chuck sprockets 170 and the chain.

The upstream end of chain 380 - i.e. that portion to the right of pins 396 as viewed in FIG. 13 - has its free end anchored upon a lever 398 pivotally supported as at 400 on a mounting bracket 402 which is in turn fixed to the machine frame F. A bolt 404 is fixedly mounted upon bracket 402 and passes freely through an opening 406 in lever 398. A compression spring 408 is seated between lever 398 and an adjustment nut 410 threadably received on the end of bolt 404. It is believed apparent that by suitable adjustment of nut 410, an adjusted resiliently maintained tension can be applied to that portion of chain 380 to the right of pins 396 as viewed in FIG. 13.

At a location intermediate pins 396 and lever 398, chain 380 is engaged by a resilient strut assembly designated generally 412. Strut assembly 412 includes a hollow tubular sleeve 414 which is pivotally coupled at one end to chain 380 as at 416. Sleeve 414 slidably receives one end of a pin 418 which is pivotally supported at its opposite end upon machine frame F as at 420. A compression spring 422 is engaged between a shoulder on pin 418 and an adjustment nut 424 threadably received on the outer side of sleeve 414. Spring 422 thus tends to extend the length of strut 412 with a resiliently applied force.

It will be observed from FIG. 13 that that section of chain 380 between pins 396 and 398 is not parallel to the path of movement of chuck sprockets 170, but converges toward the sprocket path in its extent from lever 398 toward pins 396.

Because the rotative orientation of chuck sprockets 170 as they approach chain 380 is completely random, the initial engagement between a tooth on the chuck sprocket and a chain pin on chain 380 will not always be at a mechanically desired relationship. Further, the chuck sprocket is moving at a constant velocity, while the chain pin is stationary, thus resulting in a fairly substantial impact at the initial moment of full contact. This impact is to some extent cushioned by the resilient, relatively light tensioning bias applied to this section of the chain by lever 398, while strut 412 resiliently resists lateral whipping of this rather loosely tensioned section of the chain under the impacting caused by the initial chain-chuck sprocket engagement. The convergent relationship of this section of the chain to the sprocket path also permits the sprocket to initially contact any one of several different chain pins, depending upon the rotative position of the sprocket, thus distributing the wear due to impacting over several chain pins.

That portion of chain 380 to the left of pins 396 as viewed in FIG. 13 is somewhat more tightly tensioned by passing the free end of the chain around a sprocket 426 rotatably mounted on the machine frame at 428.

This free end of the chain is coupled to a rod 430 slidably received within and projecting through a mounting block 432 fixedly mounted on the machine frame. A compression spring 434 is engaged between block 432 and an adjustment nut 436 threadably mounted on the end of rod 430 is employed to establish the desired tension adjustment and take care of chain stretch.

A generally similar stationary chain-type spin cycle mechanism (not shown) is also employed at inspection station 78 to rotate the chucks as they pass through the inspection station.

Details of the variable speed spin cycle assembly 76 employed to rotate the chucks during their passage through main burners 74 are best shown in FIGS. 15 through 20 inclusive.

Referring first to FIG. 15, spin cycle mechanism 76 includes an endless chain 440 which is operatively trained around an upstream end sprocket 442 and a downstream end sprocket 444, the terms upstream and downstream referring to the direction of movement of chuck sprockets 170. chain 440 is driven in movement along its endless path by a reversible variable speed drive mechanism designated generally 446 which includes a reversible variable speed drive motor 448 which is drivingly coupled to a drive sprocket 450 mounted for rotation in the machine frame. A pair of idler sprockets 452 mounted in the machine frame for free rotation adjacent sprocket 450 confine the path of chain 440 to one which extends around a substantial portion of the periphery of main drive sprocket 450 in a more or less conventional arrangement.

As was the case with the stationary chain spin cycle mechanism previously described, the path of chain 440 converges from upstream end sprocket 442 toward the path of chuck sprockets 170. Chain 440, in passing from end sprocket 442 toward the path of chuck sprockets 170 is trained around a guide sprocket 464 mounted in the machine frame for free rotation about a stationary axis as at 465. Immediately to the right of sprocket 464, as viewed in FIG. 15, the chain is engaged within a chain track 466 which supports and guides chain 440 in movement.

Between sprockets 442 and 464, that run of chain 440 adjacent the chuck sprocket path is engaged by a sprocket 468 mounted for free rotation upon a bell crank 470. Bell crank 470 is mounted at one end for pivotal movement upon the machine frame as by a fixed pivot 472. The opposite end of bell crank 470 is pivotally coupled to a rod 474 slidably mounted in a bracket 476 fixedly mounted upon the machine frame. A compression spring 478 engaged between bracket 476 and an adjustment nut 480 threadably received on rod 474 resiliently biases bell crank 470 in a counterclockwise direction about pivot 472 as viewed in FIG. 15, thus urging sprocket 468 against chain 440 to bow the chain outwardly toward the path of chuck sprockets 170. Bell crank 470 and its sprocket 468 perform the same function as did adjustable strut assembly 412 of spin cycle mechanism 72.

Referring now to FIG. 16, there is shown in this Figure a typical cross-section of chain track 466. Preferably, the track assembly is built-up, as indicated, from individual layers of strip stock to form opposed guide channels complementary in shape to the chain cross-section. Chain 440 is formed with chain pins 482 which carry rollers 484 at each end. A pair of links 486 are carried on the pin between rollers 484, the links being maintained in spaced relationship to each other and to rollers 484 by tubular spacers 488 loosely received upon chain pin 482 and mounted between the rollers and links. In their transverse extent, the links 486 are not symmetrically disposed with respect to the chain pin, but are extended on the inner side of the chain to slidably project into complementary recesses 490 formed in the chain track 466. Rollers 484 of the chain are received within grooves 492 formed in channel-shaped retainer members 494 of the chain track assembly. As indicated in FIG. 16, chuck sprockets 170 engage the chain between links 486, all of the various sprockets engaging the chain at the outer sides of links 486.

Figure 19:
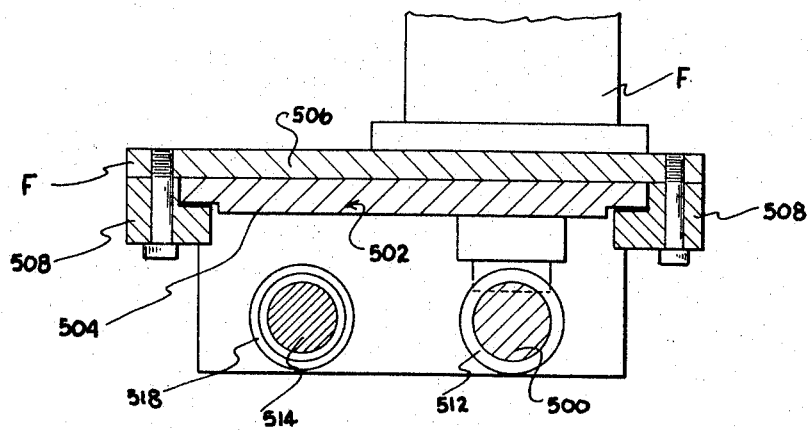
FIG. 19 is a cross-sectional view taken on line 30—30 of FIG. 17.
Figure 20:
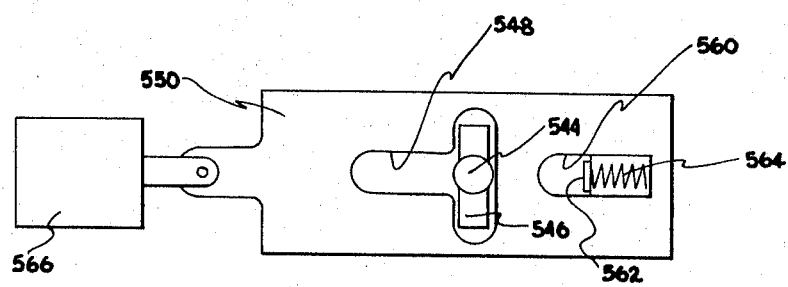
FIG. 20 is a cross-sectional view taken on line 31—31 of FIG. 17.

Downstream end sprocket 444 is mounted upon and supported by a chain tensioning mechanism designated generally 496 which acts to apply operative tension to the chain. End sprocket 444 is rotatably mounted in a yoke 498 which is secured to one end of a ratchet rod 500 which is slidably mounted in the frame 502 of mechanism 496, frame 502 in turn being slidably mounted on the frame F of the machine. Referring particularly to FIGS. 17 and 20, tension mechanism frame 502 includes a main frame plate 504 which is slidably supported on the underside of a plate 506 forming a portion of the main machine frame F, plate 504 being supported as by gibs 508 (FIG. 19). A pair of slide brackets 510 are fixedly secured to the lower side of frame plate 504 and formed with aligned bushed bores 512 which slidably support ratchet rod 500, as best seen in FIG. 17. As best seen in FIG. 18, brackets 510 also slidably support a push rod 514 in parallel spaced side-by-side relationship to ratchet rod 500. At their right-hand ends, as viewed in FIGS. 15, 17 and 18, rods 500 and 514 are fixedly secured to a tie bar 516 which rigidly and fixedly connects the respective rods to each other. Referring now to FIG. 18, a compression spring 518 is engaged between the left-hand slide bracket 510 and an adjustment nut 520 threadably received on rod 514. Compression spring 518 exerts a resiliently adjusted force, depending upon the position of nut 520, urging rod 514 to the right, as viewed in FIG. 18. This force is directly transmitted by tie bar 516 to ratchet rod 500, thereby urging ratchet rod 500 and its coupled end turn sprocket 444 to the right as viewed in FIGS. 15 and 17 to tension chain 440.

To establish a minimum permissible chain tension, frame plate 504, as mentioned above, is adjustably supported for movement relative to the machine frame from right to left or vice versa as viewed in FIG. 17. The adjusted position of frame plate 504 in turn establishes the position at which tie bar 516 is engaged with the right-hand slide bracket 510, thus establishing the maximum possible limit to leftward movement of end sprocket 444 as viewed in FIGS. 15 and 17. Positioning of frame plate 504 is accomplished by means of an adjustment screw 552 threadably received within a mounting block 524 which which is fixedly secured, as by welding, to frame plate 504. Bolt 552 bears against a pad 526 mounted upon the machine frame F. When threaded into block 524 from the position shown in FIG. 17, bolt 522 will drive frame plate 504 to the right from the illustrated position.

That section of chain 440 between sprocket 464 and sprocket 444 - i.e. the chuck sprocket engaging run of chain 440 - is subjected to a cyclically varying loading during operation of the machine, the load being reduced as a chuck sprocket 170 leaves the chain at sprocket 444 and being increased as a chuck sprocket 170 passes to the right of sprocket 464. Even when the arrival of a new chuck at one end of this chain section is precisely synchronized with the departure of an old chuck from the downstream end, the point of application and release of the load are different, and hence a periodic or cyclic loading variation is encountered by the chain. Variations in line speed of the chucks, the speed and direction in which chain 440 is being driven, and many other variable factors present a possibility that under certain conditions this variable loading may start to approach a resonant condition, particularly where the tension in the chain is applied by a spring.

To overcome this problem, a ratchet mechanism designated generally 528 is employed to lock ratchet rod 500, and hence sprocket 444 in the maximum rightward position to which they have been biased by spring 518.

As best seen in FIG. 17, ratchet rod 500 is formed with a series of ratchet teeth 530 on its upper side, the right-hand side of each tooth 530, as viewed in FIG. 17, being inclined. A pawl 532 is supported for vertical sliding movement with a hollow sleeve 534 fixedly mounted upon the machine frame. The lower end of pawl 532 is formed with a latch tooth complementary in shape to the teeth 530 on rod 500 - i.e. the left-hand side of latch tooth 536 is inclined oppositely to the inclined right-hand edges of ratchet teeth 530. The inclined surfaces on the respective teeth enable rod 500 to be pulled to the right as viewed in FIG. 17, the engaged inclined surfaces of the respective teeth sliding to enable pawl 532 to move upwardly as a ratchet tooth slides beneath it and to then drop downwardly in front of the ratchet tooth to prevent leftward movement of the rod. A compression spring 538 within sleeve 534 resiliently biases pawl 532 downwardly against ratchet rod 500.

During normal operation of the machine, chain 400 tends to expand, due to its relatively close proximity to main burners 74, and thus, as the chain expands, its tension decreases until the opposing force of spring 518 is able to shift ratchet rod 500 to the right. This expansion of the chain results in a continuing step-by-step adjustment of rod 500 to the right, pawl 532 dropping in front of successive ratchet teeth 530 as the adjustment proceeds step by step.

When it is desired to shut down the line, cooling of the chain will cause the chain to contract, thus increasing the chain tension by virtue of the fact that sprocket 444 cannot move to the left to relieve the tension because of the engagement between pawl 532 and the aligned ratchet tooth. In order to prevent this buildup in chain tension upon machine shutdown, a system for automatically releasing the ratchet mechanism upon shutdown is provided.

Pawl 532 is connected, at its upper end, to the armature 540 of a solenoid 542. An extension 544 on the upper end of armature 540 projects upwardly beyond solenoid 542, and a cross-pin 546 is fixedly mounted at the upper end of extension 544. Referring to FIG. 20, it is seen that cross-pin 546 is normally disposed within the arm section of a T-shaped slot 548 in a slide plate 550. Plate 550 is mounted for sliding movement from left to right as viewed in FIGS. 17 and 20 between a pair of stationary plates 552 and 554 which are fixedly mounted upon the machine frame. As best seen in FIG. 17, the lower fixed plate 552 is bored as at 556 to provide free passage for extension 544, while the upper fixed plate 554 is formed with a transversely extending slot 558 which provides clearance for free upward movement of extension 544 and cross-pin 546.

Referring to FIG. 20, an elongate slot 560 formed in plate 550 provides clearance for a fixed post 562 secured to and extending between upper and lower fixed plates 554, 552. A compression spring 564 is engaged between post 562 and the right-hand end of slot 560 to resiliently bias plate 550 to the right as viewed in FIGS. 20 and 17.

When solenoid 542 is in its normal, de-energized position, its armature 540 and extension 544 are in the position shown in FIG. 17, in which cross-pin 546 is engaged in the arm section of T-shaped slot 548 to prevent slide plate 550 from moving to the right under the biasing action of spring 564.

When the machine is shut down, solenoid 542 is energized and elevates its armature 540 and extension 544 upwardly to a position where cross-pin 546 is located above slide plate 550. With cross-pin 546 disengaged from T-shaped slot 548, slide plate 550 is free to move to the right from the FIG. 20 position, the leg portion of T-shaped slot 548 clearing the extension 544, until the left-hand end of slot 548 engages the extension 544. When solenoid 542 is subsequently de-energized, spring 538 attempts to pull the solenoid armature downwardly, however, cross-pin 546 is no longer aligned with the arm portion of slot 548 and thus cannot move downwardly, thereby retaining pawl 532 in a position withdrawn clear above ratchet rod 500.

When the machine is subsequently started up, a second solenoid 566 is momentarily energized to pull slide plate 550 to the left to return the arm portion of T-shaped slot 548 into vertical alignment with cross-pin 546. As soon as this occurs, spring 538 pulls extension 544 downwardly to again position cross-pin 546 within the arm portion of slot 548, and restoring pawl 532 into engagement with the ratchet teeth 530 on rod 500.

CHAIN LUBRICATION SYSTEM

Details of the chain lubrication system 92 are shown in FIGS. 18 through 23 and disclosed in parent Pat. 3,726,559 and is also the subject matter of copending divisional application Ser. No. 267,677 filed June 29, 1972.

Further details of the operation of the overall machine are set forth in our U.S. Pat. No. 3,726,559.

While we have described one embodiment of our invention it will be apparent to those skilled in the art that the disclosed embodiment may be modified. Therefore, the foregoing description is to be considered exemplary rather than limiting and the true scope of the invention is that defined in the following claims.

We claim:

1. Container handling apparatus comprising a frame, horizontally extending upper and lower track means mounted on said frame in vertical alignment with each other, first curved track means mounted on said frame to connect one end of said upper track means to one end of said lower track means, second curved track means mounted on said frame connecting the respective other ends of said upper and lower track means to each other, an endless conveyor chain having a plurality of uniformly spaced transversely extending link pin means, roller means on said link pin means engaged with said track means to support and guide said chain along an endless path established by the interconnected track means, drive means for driving said chain in movement along said endless path, a plurality of container chuck assemblies mounted in uniformly spaced relationship upon said link pin means for movement with said chain along said endless path, and means for minimizing the centripetal acceleration imparted to said chuck assemblies as the chuck assemblies move to and from said curved track means.

2. Apparatus as defined in claim 1 wherein said means for minimizing acceleration comprises a parabolic track section on each of said curved track means having a large radius section connected to the adjacent upper or lower track means and a small radius section merging with a constant radius portion of the curved track means.

3. In an article handling apparatus having a plurality of article supporting chucks linked together into an endless chain, a frame, and drive means for driving said chain of chucks upon said frame along an endless path, each of said chucks having a chuck sprocket mounted thereon for rotation about an axis normal to said path for rotating an article supported upon the chuck as the chuck is driven along a selected portion of said path; a spin cycle mechanism comprising an endless sprocket chain operatively trained about a pair of end sprockets and having one run extending between said end sprockets parallel to the path of movement of said chuck sprockets for meshing engagement therewith along said selected portion of said path, tensioning means supporting one of said end sprockets on said frame for movement parallel to said path, spring means biasing said one of said end sprockets away from the other of said end sprockets to thereby resiliently apply tension to said sprocket chain, and one-way ratchet means including a toothed member on said tensioning means and a pawl mounted upon said frame for locking said one of said end sprockets against movement toward the other of said end sprockets while accommodating movement of said one end of said end sprockets away from the other of said end sprockets.

4. The invention defined in claim 3 further comprising release means operable to withdraw and maintain said pawl out of engagement with said toothed member.

5. The invention of claim 4 wherein said release means comprises a first actuating member coupled to said pawl and operable when actuated to shift said pawl out of engagement with said toothed member, and second actuating means operable when said pawl is in a retracted position out of engagement with said toothed member to positively lock said pawl in said retracted position.

6. The invention defined in claim 5 wherein said second actuating means comprises a first shaft constituting an extension of said pawl, a cross shaft mounted on said extension at right angles thereto, a plate slidably mounted in said frame for movement in a direction mutually perpendicular to said extension and said cross shaft, means defining a T-shaped slot in said plate having a leg extending parallel to the direction of movement of said plate adapted to receive said extension and arm portions adapted to receive said cross shaft when said arm portions are aligned therewith, said cross shaft being received in said arm portions of said slot when said pawl is engaged with said toothed member and being projected clear of said plate when said pawl is in said retracted position, and third spring means resiliently biasing said plate in a direction urging the leg portion of said slot toward said cross shaft.

7. In an article handling conveyor having an endless chain of pivotally interconnected links, track means for supporting and guiding said chain in movement along an endless path having a horizontal upper run, a horizontal lower run, and curved end turn sections interconnecting the ends of said upper and lower runs to each other, an article carrying chuck means mounted at uniformly spaced locations on said chain for movement therewith, and drive means for driving said chain in movement along said endless path;

the improvement wherein said drive means comprises a first drive sprocket meshed with said chain at vertically aligned first and second points respectively located on said upper and lower runs intermediate the ends of said runs, a second drive sprocket meshed with said chain at a third point located on said lower run between said second point and one of said end turns, first and second drive means for respectively driving said sprockets to advance said chain successively past said first, second and third points, work station means extending along said lower run between said second and third points for working on articles conveyed therealong by said chuck means, means in said drive means for maintaining a relatively high tension in said chain between said second and third points and for maintaining a lower tension in said chain between said third and first points, and means for adjusting the tension in said chain between said first and second points independently of said means in said drive means to thereby maintain a relatively firm tension in that section of said chain opposite said work station means while maintaining a lower tension in said chain where said chain passes around that end turn section.

* * * * *

UNITED STATES PATENT OFFICE
CERTIFICATE OF CORRECTION

PATENT NO. : 3,868,010
DATED : Feb. 25, 1975
INVENTOR(S) : John D. Banyas, Edward A. Ross It is certified that error appears in the above-identified patent and that said Letters Patent are hereby corrected as shown below:

Col. 6, line 33, change "73" to read --74--.
Col. 7, line 65, change "a" to read "A".
Col. 8, line 29, change "more" to read --move--;
      line 40, change "emply" to read --employ--.
Col. 9, line 14, after "P-2", insert --respectively located on the upper and lower runs of the--.
Col. 10, line 52, change "containers" to read --container--.
Col. 11, line 23, change "contaner-gripping" to read --container-gripping--.
Col. 13, line 11, change "sahft" to read --shaft--.
Col. 16, line 25, change "chain" to read --Chain--.
Col. 17, line 62, delete "which" (second occurrence).
Col. 18, line 43, change "400" to read --440--.

Signed and Sealed this fifth Day of August 1975

[SEAL]

Attest:

RUTH C. MASON
*Attesting Officer*

C. MARSHALL DANN
*Commissioner of Patents and Trademarks*